United States Patent Office 3,312,605
Patented Apr. 4, 1967

3,312,605
PREPARATION OF ORGANO METALLIC COMPOUNDS
David G. Braithwaite, Chicago, Ill., assignor to Nalco Chemical Company, Chicago, Ill., a corporation of Delaware
No Drawing. Filed Oct. 24, 1965, Ser. No. 505,038
16 Claims. (Cl. 204—59)

This application is a continuation-in-part of copending applications Ser. Nos. 93,362 filed Mar. 6, 1961, and 326,221 filed Nov. 26, 1963, now abandoned.

The present invention relates to the preparation of organo metallic compounds, and more particularly to a new and improved process for making organic lead compounds.

It is known in accordance with U.S. 3,007,858 to make organo metallic compounds and especially organic lead compounds by electrolyzing an anhydrous solution of a Grignard reagent in an organic solvent for the Grignard reagent, using a sacrificial anode, and adding an organic halide to the electrolyte.

Various organic solvents for the Grignard reagent have been suggested, including tetrahydrofuran. In U.S. 3,118,825 and U.S. 3,155,602, the use as a solvent for the Grignard reagent of ethylene glycol dialkylethers mixed with tetrahydrofuran has been suggested with the proviso that such dialkylethers of ethylene glycols should have fewer than three ethylene groups in the glycol portion. According to the disclosures of these patents, when tetrahydrofuran is mixed with the dialkylether of ethylene glycol having fewer than three ethylene groups in the glycol portion and used as a solvent for a Grignard reagent, the quantity of tetrahydrofuran can be within the range from about 2% to 60% by weight of the solvent mixture, and the quantity of the dialkylether of the ethylene glycol having not more than two ethylene groups in the glycol portion is within the range of about 98% to 40% by weight of the solvent mixtures. It is further specified that there should be at least two carbon atoms in each alkyl group of the dialkylether of the ethylene glycol. Otherwise, when this solvent mixture of a Grignard reagent is employed as an electrolyte with a sacrificial anode, such as lead, etherates are formed which precipitate from the electrolyte, thereby fouling the equipment. The tetrahydrofuran when used as a solvent for the Grignard reagent increases the conductivity and therefore such use is highly desirable. However, the proportions of tetrahydrofuran used are necessarily limited when the amount employed is sufficiently high to form insoluble etherates.

It would be desirable to provide an electrolyte containing a Grignard reagent and a higher proportion of tetrahydrofuran without precipitation of etherates from the electrolyte, thereby increasing the conductivity and improving the efficiency of the process.

One of the objects of this invention is to provide a new and improved electrolyte containing a Grignard reagent suitable for use in making organo metallic compounds by passing an electrolyzing current through a sacrificial anode and a suitable cathode in contact with said electrolyte.

Another object of the invention is to provide a new and improved process for producing organo metallic compounds.

A more specific object of the invention is to provide a new and improved electrolyte and a new and improved process for producing organic lead compounds, especially tetraalkyl lead compounds, such as, for example, tetraethyl lead and tetramethyl lead. Other objects will appear hereinafter.

These objects are accomplished in accordance with the invention by providing an electrolyte comprising a Grignard reagent dissolved in a mixture of solvents, one of said solvents being tetrahydrofuran and another being a diether of a polyoxyalkylene glycol containing at least three alkylene groups in the glycol portion. By using a mixed solvent of this type in which the diether of the polyoxyalkylene glycol contains at least three alkylene groups in the glycol portion, it is possible to employ a wider range of proportions and higher proportions of tetrahydrofuran with greater efficiency of operation in a process wherein the electrolyte is electrolyzed employing a suitable cathode and a sacrificial anode, and especially in making tetraalkyl lead compounds, such as, for example, tetramethyl lead and tetraethyl lead.

Typical examples of suitable diethers of glycols are those having the following formulae:
(1)  R—O—$R_1$—O—$R_2$—O—$R_3$—O—$R_7$
(2)  R—O—$R_1$—O—$R_2$—O—$R_3$—O—$R_4$—O—$R_7$
(3)  R—O—$R_1$—O—$R_2$—O—$R_3$—
     O—$R_4$—O—$R_5$—O—$R_7$
(4)  R—O—$R_1$—O—$R_2$—O—$R_3$—
     O—$R_4$—O—$R_5$—O—$R_6$—O—$R_7$ where the radicals R and $R_7$ are the same or different hydrocarbon radicals, and the radicals $R_1$, $R_2$, $R_3$, $R_4$, $R_5$ and $R_6$ are the same or different alkylene radicals containing two to six carbon atoms.

A more general formula for suitable diethers of glycols can be written as follows:
(5)  $R(OC_nH_{2n})_xOR_7$ where R and $R_7$ are the same or different hydrocarbon radicals, n is 2 to 6 and x is at least 3. The oxyalkylene radicals represented by $(OC_nH_{2n})$ can be and preferably are all oxyethylene radicals but they can also be, for example, all oxy-1, 2-propylene, or all oxy-1, 2-butylene, oxyamylene, or oxyhexylene, or mixtures either in random or sequential succession, such as, for example, —$OC_2H_4 \cdot OC_3H_6$—, or —$OC_2H_4 \cdot OC_3H_6 \cdot OC_2H_4$—, or —$OC_2H_4 \cdot OC_2H_4 \cdot OC_3H_6 \cdot OC_2H_4 \cdot OC_2H_4$— or

—$OC_2H_4 \cdot OC_3H_6 \cdot OC_3H_6 \cdot OC_2H_4$— or —$OC_2H_4 \cdot OC_4H_8 \cdot OC_2H_4$—. Preferred diethers are those in which R and $R_7$ are hydrocarbon radicals containing 2 to 7 carbon atoms, n is 2 and x is 3 to 6.

In general, the hydrocarbon radicals (including the alkylene radicals) in the Formulae 1 to 5 should be of such configuration and chain length, either straight or branched, that the solvent is normally liquid under the electrolytic conditions and preferably normally liquid at 20° C. In any case, the mixture of tetrahydrofuran and the diether of the glycol should be liquid under the conditions of use.

To illustrate the diethers of glycol more specifically, in formula 5, n can be 2, x can be 3 or 4 and R and $R_7$ can both be methyl or both be ethyl, or both propyl, or both isopropyl, or both butyl, or both amyl, or both hexyl, or both phenyl, or one can be ethyl and the other phenyl, or one can be ethyl and the other benzyl, or one can be ethyl and the other hexyl.

The term "Grignard reagent" as used herein refers to the product obtained by reacting approximately equimolar proportions of a compound having the formula RX and Mg according to the equation:

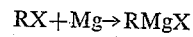

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl, and the like. The radical X can be, for example, chlorine, bromine or iodine.

The principal reactions contemplated by the invention are those in which a Grignard reagent is electrolyzed in the presence of a sacrificial lead anode and in which R is methyl and/or ethyl, and X is chlorine. Thus, tetramethyl lead can be made in accordance with the invention by electrolyzing methyl magnesium chloride, using a lead anode, and tetraethyl lead can be made in accordance with the invention by electrolyzing ethyl magnesium chloride, using a lead anode.

The invention also contemplates the manufacture of mixed alkyl lead compounds, such as, triethylmethyl lead, diethyldimethyl lead and ethyltrimethyl lead, usually in the form of mixtures with tetraethyl lead and tetramethyl lead by using as the electrolyte mixtures of methyl magnesium chloride and ethyl magnesium chloride. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues. Similarly, the phenyl magnesium chloride, phenyl magnesium bromide or mixtures of phenyl and ethyl magnesium chloride, or mixtures of phenyl and ethyl magnesium bromide, or mixtures of phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide. In a similar manner benzyl magnesium chloride can be employed as an electrolyte.

The cathode may be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The process is preferably carried out by adding an extraneous organic alkyl halide to the electrolyte during the electrolysis or by adding two or more organic halides to an electrolyte containing either a single Grignard reagent or a mixture of Grignard reagents. Thus, by adding two different alkyl halides to the Grignard reagent dissolved in the organic solvent, for example, by adding methyl chloride and ethyl chloride to a Grignard reagent consisting initially of methyl magnesium chloride dissolved in a mixture of tetrahydrofuran and the organic ether, organo lead compounds are obtained containing both methyl and ethyl radicals linked to the metallic lead atom. Similarly, if mixtures of methyl chloride and tertiary butyl chloride are used as the extraneous halides, the resultant compounds contain methyl groups and tertiary butyl groups linked to the lead atom, or if mixtures of ethyl chloride and tertiary butyl chloride are used, the resultant compounds contain both ethyl groups and tertiary butyl groups linked to the lead atom.

The mixture of organic solvents comprising the tetrahydrofuran constituent and organic diether serve many purposes. Firstly, the tetrahydrofuran component unexpectedly increases the conductivity of the cell electrolyte to a point where reactivity is increased several fold. Thus, the total yield of organic lead compound over extended periods of time can be greatly increased. Yet, such increase in efficiency is achieved without sacrifice of yield.

While the tetrahydrofuran organic solvent thus promotes increased conductivity, and overall yield per unit time, it has been determined that its use conjointly with the above defined organic ether solvents overcomes difficulties that arise when the tetrahydrofuran is used alone.

More specifically, the most preferred organic solvent systems of the invention comprise 20–80% by weight of tetrahydrofuran and 80–20% by weight of the above described diethers. Surprisingly, it has ben discovered that tetrahydrofuran in amounts substantially in excess of 60% by weight of the solvent mixture can be employed when diethers of glycols of the type defined are used, without the formation of insoluble precipitates which interfere with the cell operation. Especially good results are obtained with 65–75% by weight of tetrahydrofuran mixed with a diether of a glycol of the type previously described.

The described glycol ether solvent mixtures with tetrahydrofuran can be employed in conjunction with still other solvents including other types of organic ether solvents, such as, for example, the dimethylether or the diethylether or the dipropylether of diethylene glycol, the dipropylether of dipropylene glycol, the dibutylether of diethylene glycol, or the dimethylether of dipropylene glycol, or the hexylethylether of diethylene glycol.

Good results are obtained by employing the above described organic solvent system comprising a liquid diether of a polyalkylene glycol and tetrahydrofuran in conjunction with aromatic hydrocarbons such as toluene, benzene, etc. Some of these latter aromatic substances, such as benzene, assist in preventing the formation of several liquid phases. Others such as toluene serve as stabilizers, especially in the recovery of tetramethyl lead. The use of these substances for specific purposes does not constitute a part of this invention. It suffices to note that the addition of such aromatic hydrocarbons to the electrolyte does not substantially alter the results obtained by the practice of this invention.

The process is normally carried out at temperatures above the freezing point of the solution and below the boiling points of the glycol diether solvent. Higher current densities tend to heat the solution and cooling may be applied, if necessary. In general, good results are obtained at temperatures within the range of 20° C. to 65° C. and in the preparation of tetramethyl lead and tetraethyl lead temperatures within the range of 30° C. to 50° C. are preferably employed.

The pressures used are normally sufficient to maintain the liquid phase with the particular solvent and temperature conditions employed. According to one method of operating the process, extraneous organic halide, such as, for example, methyl chloride and/or ethyl chloride, is added to the electrolyte and superatmospheric pressures normally prevail in the reaction cell. These pressures will vary, depending upon the quantity of the organic halide and the type of solvent, but in general, the process will be operated at pressures less than 5 atmospheres.

One way of carrying out the process is to electrolyze the electrolyte until the Grignard reagent therein is substantially exhausted. Another way is to separate a part of the electrolyte and recover at least a part of the desired product, thereafter returning separated solvent and also Grignard reagent to the cell. The present invention is not particularly concerned with the manner in which the product is recovered.

The type of electrolytic cell used is also subject to variation and does not constitute a part of this invention. A suitable type of cell is disclosed in U.S. Patent 3,141,841.

The invention will be further illustrated but is not limited by the following examples in which the quantities are stated in parts by weight unless otherwise indicated.

*Example I*

A Grignard solution was prepared by mixing together 5220 parts of tetrahydrofuran, 3470 parts of the benzylethyether of triethylene glycol having a boiling range from 320–340° C., 425 parts of magnesium and 885 parts of methyl chloride at a temperature of 33–39° C. under a pressure of 5 p.s.i.g. The methyl chloride was added gradually over a 3½ hour period.

The resultant methyl magnesium chloride-solvent solution containing a slight excess of methyl chloride was then electrolyzed at a temperature of about 46° C. and additional methyl chloride was added to give 3 weight percent of excess methyl chloride.

The run was carried out at an average temperature of 46° C. for a period of 14.75 hours. The voltage used was approximately 28 volts and the total ampere hours were 344. The current density was about 16.7 amperes per square foot. The current efficiency was approximately 174%. The run was continued until the Grignard conversion was 87.5% and the tetramethyl lead, based in the Grignard reagent converted, was 100%. The yield based on the magnesium charged was 82.5%.

*Example II*

The procedure is the same as that described in Example I except that ethyl chloride is used instead of methyl chloride to form ethyl magnesium chloride as the Grignard reagent. In this case an excess of ethyl chloride corresponding to about 0.9 mole per mole of Grignard reagent is employed.

*Example III*

The procedure is the same as Example I except that the Grignard solvent consists of 30% by weight diethylether of tetraethylene glycol and 70% by weight of tetrahydrofuran.

*Example IV*

The procedure is the same as Example II except that the Grignard solvent consists of 30% by weight diethylether of tetraethylene glycol and 70% by weight of tetrahydrofuran.

Similarly, in the foregoing examples other organic halides, such as phenyl chloride, benzyl chloride and cyclohexyl chloride and higher homologues of the alkyl halides can be substituted for the methyl chloride or ethyl chloride. Likewise, the corresponding bromides and iodides of the alkyl halides or other organic halides may be used as a substitute for or to partly replace the organic chlorides. In general, it is preferable to use organic halides containing not more than 18 carbon atoms.

The optimum conditions will vary depending upon the particular organic halides used but it is preferable to operate with a total concentration of extraneous organic halides within the range of 0.1 to 1.1 moles per mole of total Grignard reagent.

In carrying out the process the initial Grignard concentration is subject to wide variation, but is preferably within the range of 0.5 to 2.5 millimoles per gram of solution.

It will be recognized that various methods, including fractional distillation, vacuum distillation and steam distillation, may be employed in recovering the products. The present invention is not concerned with the particular manner in which the products are recovered. Furthermore, the critical point of the invention does not lie in the particular voltages or amperages used. These may vary within the ranges of 2 to 35 volts and the current requirements are normally within the range of 2 amperes to 30 amperes. The current density will usually vary within the range of about 2 amperes per square foot to 30 amperes per square foot. The optimum current density will vary somewhat depending upon the temperature. In general, the higher the temperature used, the higher the current density. The temperatures of 30° C., 35° C., 45° C., and 50° C. can be used with satisfactory results.

The term "extraneous" as used herein with reference to "extraneous organic halide," and the like, means that an excess or additional quantity of the organic halide is employed over the equimolecular proportions initially required to react with magnesium to form a Grignard reagent.

While the invention has been illustrated with the preparation of organic lead compounds, it will be apparent that the metal of the anode can be another metal capable of dissolving when used as an anode in an anhydrous organic solvent solution of a Grignard reagent. Examples of such other metals are aluminum, calcium, zinc, cadmium, manganese, mercury, lanthanum, thallium, arsenic, bismuth, tellurium and selenium.

Where an aromatic hydrocarbon, for example, toluene or benzene, is added to the electrolyte, the addition can be made before, during or after the electrolysis. Aromatic hydrocarbons are used as stabilizing agents with the organo metallic compounds and also reduce the concentration of the organo metallic compounds. If the aromatic hydrocarbon, for example, toluene, is added to the electrolyte before electrolysis, a stabilizing quantity is used which does not normally exceed 0.5 mole per mole of Grignard reagent. Larger amounts of aromatic hydrocarbons have been used and, in the case of benzene, amounts as high as eight moles of benzene per mole of Grignard reagent have been employed.

The invention is hereby claimed as follows:

1. A process for preparing organo metallic compounds which comprises electrolyzing, using a sacrificial anode, an anhydrous solution of a Grignard reagent in a mixed solvent of tetrahydrofuran and a diether of a glycol having the following formula:

$$R(OC_nH_{2n})_xOR_7$$

where R and $R_7$ are the same or different hydrocarbon radicals, $n$ is 2 to 6, and $x$ is at least 3, said solution being liquid under the conditions of reaction, the quantity of tetrahydrofuran being sufficient to increase the conductivity of said solution and said diether providing a liquid mixture at 20° C.

2. A process as claimed in claim 1 in which R and $R_7$ each contains at least 2 carbon atoms.

3. A process as claimed in claim 1 in which the proportion of tetrahydrofuran in said mixed solvent is in excess of 60% by weight.

4. A process as claimed in claim 1 in which the proportion of tetrahydrofuran in said mixed solvent is in excess of 60% and not more than 75% by weight.

5. A process as claimed in claim 1 in which the sacrificial anode is lead and the Grignard reagent is a methyl Grignard reagent.

6. A process as claimed in claim 1 in which the sacrificial anode is lead and the Grignard reagent is an ethyl Grignard reagent.

7. A process as claimed in claim 1 in which the sacrificial anode is lead, the Grignard reagent is methyl magnesium chloride, and the quantity of tetrahydrofuran in said mixed solvent is within the range of 20–80% by weight.

8. A process as claimed in claim 1 in which the sacrificial anode is lead, the Grignard reagent is methyl magnesium chloride, and the quantity of tetrahydrofuran in said mixed solvent is in excess of 60% and not mor ethan 75% by weight.

9. A process as claimed in claim 1 in which the sacrificial anode is lead, the Grignard reagent is ethyl magnesium chloride, and the quantity of tetrahydrofuran in said mixed solvent is within the range of 20–80% by weight.

10. A process as claimed in claim 1 in which the sacrificial anode is lead, the Grignard reagent is ethyl magnesium chloride, and the quantity of tetrahydrofuran in said mixed solvent is in excess of 60% and not more than 75% by weight.

11. A process as claimed in claim 1 in which the sacrificial anode is lead, the Grignard reagent is methyl magnesium chloride, the mixed solvent has dissolved therein excess methyl chloride, the quantity of tetrahydrofuran in the mixed solvent is in excess of 60% but not more than 75% by weight, and the diether of a glycol constituting the remainder of the mixed solvent is the diethylether of tetraethylene glycol.

12. A process as claimed in claim 1 in which the sacrificial anode is lead, the Grignard reagent is ethyl magnesium chloride, the mixed solvent has dissolved therein excess ethyl chloride, the quantity of tetrahydrofuran in the mixed solvent is in excess of 60% but not more than 75% by weight, and the diether of a glycol constituting the remainder of the mixed solvent is the diethylether of tetraethylene glycol.

13. An electrolyte consisting essentially of an anhydrous solution of a Grignard reagent in a mixed solvent of tetrahydrofuran and a diether of a glycol having the following general formula:

$$R(OC_nH_{2n})_xOR_7$$

where R and $R_7$ are the same or different hydrocarbon radicals, $n$ is 2 to 6, and $x$ is at least 3, the quantity of tetrahydrofuran in said mixed solvent being within the range of 20–80% by weight and the quantity of said diether being within the range of 80–20% by weight.

14. An electrolyte as claimed in claim 13 in which said diether is the diethylether of tetraethylene glycol.

15. An electrolyte as claimed in claim 13 in which the quantity of tetrahydrofuran is in excess of 60% but not more than 75% by weight of said mixed solvent.

16. An electrolyte as claimed in claim 13 in which $x$ is within the range of 3 to 6 and the radicals R and $R_7$ contain 2 to 7 carbon atoms.

References Cited by the Examiner

UNITED STATES PATENTS

| 3,155,602 | 11/1964 | Linsk et al. | 204—59 |
| 3,164,537 | 1/1965 | Linsk et al. | 204—59 |

JOHN H. MACK, *Primary Examiner.*

HOWARD S. WILLIAMS, *Examiner.*